United States Patent [19]

Setzer et al.

[11] 3,962,411
[45] June 8, 1976

[54] METHOD FOR CATALYTICALLY CRACKING A HYDROCARBON FUEL

[75] Inventors: Herbert J. Setzer, Ellington; Warren R. Standley, Tolland, both of Conn.

[73] Assignee: United Technologies Corporation, Hartford, Conn.

[22] Filed: May 2, 1975

[21] Appl. No.: 574,187

Related U.S. Application Data

[63] Continuation of Ser. No. 424,486, Dec. 13, 1973, abandoned.

[52] U.S. Cl. .............................. 423/651; 23/288 R; 23/288 B; 48/102 R; 48/196 A; 48/211; 252/459; 252/466 J; 252/472; 252/477 R
[51] Int. Cl.² ...................... B01J 8/02; B01J 35/08; C01B 1/16; C10G 11/04
[58] Field of Search............. 48/211, 102 R, 196 A, 48/196 R; 23/288 R, 288 B, 281; 252/466 J, 477 R; 423/651

[56] References Cited
UNITED STATES PATENTS

| | | |
|---|---|---|
| 2,071,286 | 2/1937 | Johnson et al. ..................... 48/211 |
| 2,893,853 | 7/1959 | Milbourne ............................ 48/211 |
| 3,145,183 | 8/1964 | Fisher .......................... 252/477 R X |
| 3,207,700 | 9/1965 | Saffer........................... 252/477 R X |
| 3,264,226 | 8/1966 | Johnson........................... 252/454 X |
| 3,436,198 | 4/1969 | Baron et al. ........................... 48/214 |
| 3,513,109 | 5/1970 | Stiles................................... 252/462 |
| 3,798,176 | 3/1964 | Ao .............................. 252/477 R X |

*Primary Examiner*—Joseph Scovronek
*Attorney, Agent, or Firm*—Stephen E. Revis; Melvin P. Williams

[57] ABSTRACT

Catalytic cracking of gaseous or distillate hydrocarbon fuels for the production of hydrogen (such as for use in a fuel cell) is provided in a push/pull operated dual chamber blow and run apparatus utilizing a catalytic bed employing ring catalyzed nickel supported on porous ceramic substrates, having a graduated catalyst content such that there is a low catalyst content in the portion of the bed near the inlet and a high catalyst content in the portion of the bed near the outlet.

1 Claim, 1 Drawing Figure

U.S. Patent  June 8, 1976  3,962,411
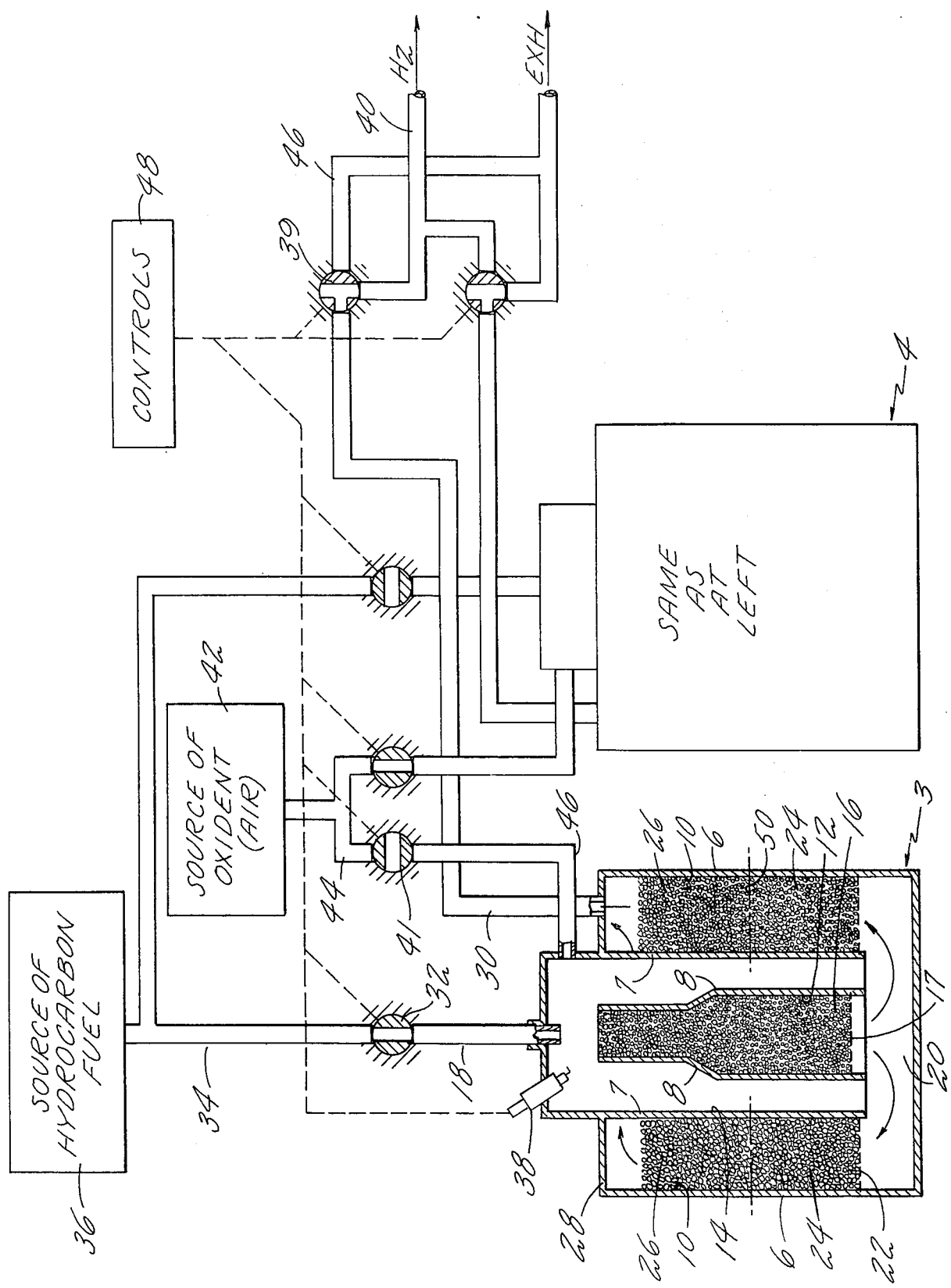

METHOD FOR CATALYTICALLY CRACKING A HYDROCARBON FUEL

CROSS REFERENCE TO RELATED APPLICATION

This application is a continuation of application Ser. No. 424,486 filed on Dec. 13, 1973, now abandoned.

BACKGROUND OF THE INVENTION

1. Field of Invention

The invention relates to the production of hydrogen from hydrocarbon fuels, in a manner useful with respect to fuel cells, and more particularly to catalytic cracking of gaseous and distillate hydrocarbon fuels.

2. Description of the Prior Art

The production of hydrogen from hydrocarbon fuels has for the most part involved the use of steam in the well-known steam reform reaction. In the utilization of hydrocarbon fuels for providing hydrogen to a fuel cell, the presence of any water whatsoever in the fuel cell feed can be prohibited due to the environment (freezing temperatures) or due to the lack of a supply of feed water. Therefore, other methods of producing hydrogen have been sought. Most of these employ hydrogen-containing gases other than hydrocarbons, and are therefore limited to utilization where the source of such a gas is readily available. Naturally, this inhibits broad usage of the fuel cell whenever the fuel cell cannot operate on commonly-available fuels such as engine fuels, natural gas and the like.

Attempts have been made in the past to utilize group VIII metals, particularly nickel, to crack hydrocarbon fuels. However, it is believed that such processes have been limited to the cracking of gaseous hydrocarbon fuels, such as natural gas, propane and the like. Furthermore, it has been found that such processes involve an unduly long purge following the burn cycle due to excessive oxidation of the catalysts during the burn cycle (which is interspersed with alternate cracking cycles), particularly when the catalyst of high nickel content is used. On the other hand, use of lower nickel content catalysts has resulted in inefficient processes with a lower yield of hydrogen.

To overcome these problems, an attempt has been made to utilize a low nickel content catalyst at the inlet of the reactor bed and a high nickel content catalyst at the exit. However, such reactors have proved impractical due to spalling of the pellets, nonreduced oxidation of the catalyst, and other problems.

SUMMARY OF INVENTION

The object of the present invention is to provide improved catalytic cracking of hydrocarbon fuels for the formation of hydrogen.

According to the present invention, a catalytic cracking bed employs a catalyst comprising nickel supported on porous ceramic substrate pellets. According further to the invention, the catalyst comprises a ring catalyst having catalytic material impregnated into a porous ceramic support substrate for a depth of on the order of 1–100 mils. In further accord with the invention, a cracking bed employs porous ceramic supported catalysts of graduated nickel content.

The present invention permits utilization of catalytic beds having a wide range of graduation configurations, from a low catalyst content at the inlet to a higher catalyst content at the outlet. The invention also avoids build-up of unoxidized carbon after successive blow and run cycles, spalling, and unreduced oxidation of the catalyst. The present invention provides reliable continuous cracking of not only gaseous, but also distillate hydrocarbon fuels into hydrogen, in a process which is suitable for utilization in a wide variety of general and special applications, particularly with respect to fuel cells. The present invention provides a reliable source of hydrogen from hydrocarbon fuels without the need of source water.

Other objects, features and advantages of the present invention will become more apparent in the light of the following detailed description of preferred embodiments thereof, as illustrated in the accompanying drawing.

BRIEF DESCRIPTION OF THE DRAWING

The sole FIGURE herein comprises a schematicized diagram of a dual chamber, blow and run cyclic catalytic hydrocarbon fuel cracking system of the present invention.

DESCRIPTION OF PREFERRED EMBODIMENTS

Referring now to the drawing, two identical reaction vessels 3, 4 are interconnected so as to be operable in a push/pull fashion, one performing a cracking cycle while the other one is performing a burn or regeneration cycle, after which the roles are reversed. The vessel 3 includes an outer wall structure 6, a first inner baffle 7 and a second inner baffle 8 so as to form a reaction chamber 10, a vaporizer chamber 12 and an oxidant inlet chamber 14. Within the vaporizer chamber 12 there is disposed a bed of uncatalyzed pellets 16 which may preferably comprise nonporous ceramic saddles or the like, contained by a grid or screen 17. The purpose of these is simply to absorb heat (in a manner described hereinafter) so that liquid hydrocarbon fuel fed thereto from a fuel inlet pipe 18, upon contact with the hot pellets, will become vaporized, a small amount of the vapor flowing into the oxidant inlet chamber 14, but substantially all of the vapor flowing through a plenum 20 formed beneath a grid or screen 22 (used to confine catalyst pellets 24, 26 within the reaction chamber 10), upwardly through the reaction chamber 10, and through a plenum 28 to an outlet pipe 30.

The fuel in the inlet pipe 18 is passed thereto by a valve 32 which is shown in the open position, which in turn is connected to a fuel pipe 34 connected to a source of hydrocarbon fuel 36. The hydrocarbon fuel may comprise any desirable fuel such as heating oils, jet engine fuel, automobile gasoline, natural gas, or the like. The source of hydrocarbon fuel, as is described hereinafter, provides fuel to one vessel or the other substantially continuously, and therefore may take the form of a continuously operating bypass pump, the bypass serving to absorb discontinuities in the flow as the valves are operated.

While the fuel is flowing from the source through the reaction chamber 10, a valve 39 is in the position shown in the drawing and serves to cause the flow of the reaction product, which is predominantly hydrogen, into a hydrogen outlet pipe 40.

As the hydrocarbon fuel flows over the pellets 24, 26 of catalyst at a suitable temperature, the hydrocarbon fuel plus heat is converted to a gaseous product comprising mainly hydrogen, together with small amounts of carbon monoxide and water (and traces of other byproducts, in dependence upon the particular hydrocarbon fuel used). In this reaction, carbon is deposited in situ on the catalyst pellet.

As is known, proper performance of a cracking cycle requires that a nickel catalyst bed be maintained at a temperature within the range of 1500°F to 2000°F. This is accomplished at start-up by an igniter 38 which is utilized to ignite the hydrocarbon fuel for a short period of time until operating temperature is reached. Thereafter, following each cracking cycle (just described) the valve 32 is closed and a valve 41 (shown in the closed position) is opened so as to permit an oxidant such as air to flow from a source 42 through a pipe 44 and an oxidant inlet pipe 46 to the oxidant inlet chamber 14. Most of the oxidant flows between the baffles 7, 8 through the plenum 20, upwardly through the reaction chamber 10 and into the outlet pipe 30. At this time, the outlet valve 39 is rotated 90° clockwise from the position shown in the drawing so that it will thereafter divert the flow to an exhaust pipe 46. Valve movement is accomplished in any well known fashion, preferably by use of solenoid valves responsive to well known timer controls 48.

As the oxidant flows over the pellets 24, 26, which are still at a relatively high temperature (on the order of 1500°F) the carbon burns (oxidizes) forming gaseous $CO_2$ which flows through the outlet pipe 30, and a large quantity of heat is generated so that the bed is re-elevated to a temperature of on the order of 2000°F. Thus, the burn cycle (or blow or regeneration cycle as it is sometimes called) removes the carbon deposits from the catalyst and reheats the catalyst to a temperature in excess of that required for operation. On the other hand, the cracking (or run) cycle consumes heat from the catalyst and generates hydrogen but at the same time poisons the catalyst with deposits of carbon thereon. Thus, the interleaved cycles of cracking and regeneration (sometimes referred to as run and blow) must be repeated in time intervals related to the poisoning of the catalyst and the consumption of the heat in the catalyst.

Although not described, it is evident that reaction vessel 4 is provided with the same inlets and outlets connected by similar valving to the fuel source 36, the oxidant source 42, and the hydrogen and exhaust pipes 40, 46. Whenever the vessel 3 is performing a cracking cycle, the vessel 4 is performing a regeneration cycle, and vice-versa, so that the flow of hydrogen is substantially continuous.

In an overall process cycle, that is from the start of a cracking cycle in the vessel 3 to the start of a subsequent cracking cycle on the vessel 3, the time may vary from on the order of 4 to 10 minutes. This time is divided substantially equally to the cracking and regeneration subcycles. Because of the oxidation of nickel catalysts near the end of the regeneration cycle that results in the formation of water and oxides of carbon at the start of the cracking cycle, the regeneration subcycle includes a purge portion in which hydrocarbon fuel is fed to it, but its exhaust valve 39 is still rotated so as to connect the outlet pipe 30 to the exhaust pipe 46. This is to prevent such byproducts from being supplied to the hydrogen stream.

Except for the fact that two different groupings of pellets 24, 26 have been referred to hereinbefore, all that has been described with respect to the drawing up to this point is known in the art. It has further been known in the art to use catalyst pellets 24 having a low catalyst content (on the order of 5% by weight or less) at the inlet end of the reactor chamber 10 (below the phantom line 50) and to use a high catalyst content (over 5% catalyst by weight) at the outlet end of the reaction chamber 10 (above the phantom line 50). However, as described hereinbefore such attempts have been unsuccessful prior to the invention herein.

According to the invention, it has been found that pure metallic substrates (such as Incoloy) are likely to melt and otherwise do not withstand the heat cycling and the successive oxidations and reductions required in blow and run cracking cycles.

As is known, the catalyst is oxidized during the regeneration cycle. The metal oxide powders and dissociates from the substrate pellet. When reduced in the following cracking cycle, the metal remains in powder form. But this is necessary in order to significantly increase the surface area of a catalytic material itself, thereby significantly increasing the number of active areas which tend to promote the desired reaction, rather than other reactions. It has been found that the powder tends to intermingle with the gaseous flow and/or to accumulate at the bottom of the reaction bed or an associated plenum, and therefore the present invention provides for the utilization of highly porous ceramic substrates since the pores of the substrate and other interstices therein tend to trap the powder to render it available for the reaction while at the same time causing substantially all of it to remain in situ on the substrate as desired.

The invention further provides for a reduction in spalling and other mechanical fracture of the catalyst pellets by using only ring catalyzed material. This is based on the discovery that spalling and fracturing occur in blow and run catalytic cracking as a result of the formation of carbon deposits internally of the substrate structure, whenever the substrate structure is sufficiently porous to permit entrance of the catalytic material and vaporous hydrocarbon fuel into internal passageways of the substrate. The invention utilizes ring catalysts that have catalytic material deposited in the interstices of porous substrate material only to a depth of on the order of 1–100 mils (depending on substrate size, to leave a substantial uncatalyzed core) so that the catalytic material is readily available to the hydrocarbon fuel, the carbon which is formed as a result of the process has a tendency to form on the external surface area rather than being trapped in the pores, and any expansion that results from the formation of carbon (in the same manner as the expansion of ice as water freezes) will not structurally stress the catalytic substrate material since it is limited to surface areas thereon.

A preferred form of catalyst for use with the invention herein is a nickel ring catalyst formed on a spherical porous substrate, of ¼ to ⅝ inch diameter, of zirconia, alumina, or a mix of the two (or even other refractory oxides, such as silica, and mixes), by a plasma spray process which is disclosed and claimed in a commonly-owned, application entitled PLASMA SPRAY CATALYST, Ser. No. 424,599, filed on Dec. 13, 1973, by D. R. McVay and R. W. Vine, now abandoned. Briefly, the process causes melted nickel powder to be sprayed onto substrate pellets as they rotate in a basket revolving on a 45° angle, and weighing of the product to determine when the percent by weight of the nickel has been deposited on the substrate pellets. Alternatively, the catalyst pellets for use in the invention, although not found to operate as satisfactorily for as long a period of time, may comprise pellets formed in an immersion chemical-conversion process in which the porous ceramic pellets are immersed in a nickel salt solution such as nickel nitrate, so that the salt solution permeates the pores of the substrate; then the substrate is dried, after which the salt is decomposed to nickel oxide and nitrogen dioxide by baking in air for about four hours at on the order of 500°F. Thereafter, the product is placed in a muffle furnace or the like in a hydrogen atmosphere for about two hours at 1000°F so as to dissociate the oxide, thus forming nickel and water. The nitrogen dioxide outgases during the reduction process, so that the conversion of the nickel oxide to nickel and water leaves the pure nickel adherent in the pores on the surface of the substrate. An improvement in the immersion process is to utilize a substrate material which has a nonporous core with a thin porous surface layer, thereby insuring that only a relatively small depth of the surface is permeated with the nickel, so as to achieve the advantages of a ring catalyst.

An additional method of providing ring catalysts for use with the invention is the process known as mulling, in which nickel powder and pellets of porous ceramic substrate are tumbled together so that a significant amount of the metal adheres to the substrate; thereafter, after heat cycling in the blow and run cracking process, or following sintering of the product, an acceptable catalyst is formed.

As stated hereinbefore, it has been found that a preferred form of catalytic bed for the hydrocarbon cracking process is utilization of a low concentration catalyst at the inlet end of the bed and a high concentration catalyst at the outlet end of the bed; this is believed to be due primarily to the fact that use of a high catalyst content results in the production of considerable oxides of carbon and water during the cracking cycle, believed to be due to undesirable side reactions involving the nickel catalysts. And further, the nickel oxide which is formed during the burn or regeneration cycle is reduced and results in the formation of water and oxides of carbon. This is undesirable since hydrogen is wasted in the formation of the water and the oxides of carbon contaminate the hydrogen stream. (This is the same reaction referred to hereinbefore with respect to the purge portion of the cycle). This undesirable effect is highly enhanced or promoted when a high nickel content is used. On the other hand, utilization of a low nickel content catalyst bed reduces the water and oxides of carbon that are formed, but tends to result in the production of methane since the catalyst is not supporting the preferred reaction adequately. All of these effects are more prominent when distillate hydrocarbon fuels are used than when gaseous hydrocarbon fuels are used, but are mitigated by use of the low content catalyst at the inlet where the reaction rate is high and high content catalyst near the outlet where the reaction rate is lower. However, it isn't necessary that a rigid interface be observed. In fact, catalysts of several different contents may be spaced along the chamber from inlet to outlet. Also, it is possible to have a central area in which some of the low catalyst is mixed with some of the high catalyst so as to provide a more even gradation if so desired. However, it is found that the use of two concentrations, even with a substantially abrupt interface, works quite satisfactorily.

The invention is significant, in that it provides improved waterless cracking; however, it can be used in a process that includes introduction of small amounts of water into the hydrocarbon fuel feed. This will provide a higher yield of hydrogen, but at a cost of small amounts of oxides of carbon in the $H_2$ stream.

Although they have not been tested, it is believed that group VIII metals other than nickel will provide suitable catalysts for use with the invention. Five examples of several different combinations of ring catalysts, found operable in accordance with the present invention, are set forth in the following Table.

TABLE

|  |  | 1 | 2 | 3 | 4 |
|---|---|---|---|---|---|
| Low Ni Content | Wt.% Ni loading | 0.8 | 1.5 | 0.56 | 1.5 |
|  | SUPPORT substrate* METHOD | ALUMINA IMMERS. | ALUMINA MULLING | ZIRCONIA FLAME SPRAY | ALUMINA MULLING |
| High Ni Content | Wt.% Ni loading | 8.0 | 20. | 20. | 6.0 |
|  | SUPPORT substrate* METHOD | ALUMINA IMMERS. | ZIRCONIA FLAME SPRAY | ZIRCONIA FLAME SPRAY | ZIRCONIA IMMERS. |
| % of reactor filled with Low Content Catalyst |  | 67 | 75 | 75 | 75 |

*All substrates are ½" dia. spheres

Although the invention has been shown and described with respect to preferred embodiments thereof, it should be understood by those skilled in the art that the foregoing and various other changes and omissions in the form and detail thereof may be made therein without departing from the spirit and the scope of the invention.

Having thus described the typical embodiments of our invention, that which we claim as new and desire to secure by Letters Patent of the United States is:

1. An improved blow and run catalytic cracking process for the production, from gaseous and distillate hydrocarbon fuels, of a gaseous product which comprises mainly hydrogen, together with small amounts of carbon monoxide and water and traces of other by-products, involving alternately making hydrogen and regenerating the catalyst bed which comprises the steps of:

A. making hydrogen by catalytically cracking without the use of steam a gaseous or distillate hydrocarbon fuel to form gaseous hydrogen and solid carbon including the steps of (1) passing said hydrocarbon fuel through a catalytic reaction bed consisting of supported metal, ring catalyzed pellets consisting of substrates of ceramics which are essentially spherical and selected from the group consisting of zirconia, alumina and mixtures of zirconia and alumina, having diameters of between one-quarter of an inch and five-eighths of an inch with nickel deposited to a depth of between one mil and one-hundred mils from the surface thereof so as to provide catalyzed substrates having substantial uncatalyzed cores, wherein said catalyzed pellets comprise between ½% and 5% nickel by weight at the inlet end of said catalyst bed and said catalyzed pellets comprise between 15% and 50% by weight nickel at the outlet end of said bed; (2) maintaining the temperature of said catalytic reaction bed at between about 1500°F and 2000°F during at least step (1); (3) conducting the hydrogen produced in said bed away from said bed; and (4) shutting off the supply of said fuel to the bed; and B. regenerating the bed without supplying additional fuel thereto including the steps of (1) passing an oxygen containing gas through said bed; (2) burning said solid carbon from said bed; (3) removing the products of combustion from said bed; and (4) shutting off the supply of oxygen containing gas to said bed.

* * * * *